United States Patent [19]

Nowak

[11] 4,034,630
[45] July 12, 1977

[54] METHOD FOR GRINDING CIRCULAR SAW TEETH TO AN IMPROVED METAL BREAKING GEOMETRY

[75] Inventor: Robert H. Nowak, Mentor, Ohio

[73] Assignee: The Motch & Merryweather Machinery Company, Cleveland, Ohio

[21] Appl. No.: 663,610

[22] Filed: Mar. 3, 1976

Related U.S. Application Data

[62] Division of Ser. No. 587,504, June 16, 1975.

[51] Int. Cl.² .................................... B23D 63/14
[52] U.S. Cl. .................................... 76/112; 76/45
[58] Field of Search .................... 76/37–40, 76/45, 48, 112; 51/288

[56] References Cited

U.S. PATENT DOCUMENTS

| | | | |
|---|---|---|---|
| 70,393 | 11/1867 | Benton | 76/45 |
| 194,705 | 8/1877 | Medearis | 76/45 X |
| 310,073 | 12/1884 | Munger | 76/45 X |
| 678,292 | 7/1901 | Churchill | 76/45 |
| 1,040,905 | 10/1912 | Dow | 76/40 |
| 1,453,765 | 5/1923 | Octave | 76/40 |
| 2,249,743 | 7/1941 | Bucknam | 76/37 |

*Primary Examiner*—Frank T. Yost
*Attorney, Agent, or Firm*—Behr & Woodbridge

[57] ABSTRACT

A circular saw includes a plurality of teeth having an improved metal breaking geometry. The saw is especially adapted to cut hard, brittle materials such as steel bars and the like. The saw teeth are generated by a cup shaped grinding wheel having a grinding face on its inside surface. By bringing the rotating inner surface of the grinding wheel into contact with each tooth, it is possible to produce a working surface on each tooth which exhibits improved metal breaking and self-cleaning characteristics. The working surface thus generated is characterized by the fact that all points on the working surface which lie in the same given plane perpendicualr to the axis of rotation of the grinding wheel are equally distant from any given point on that axis. The working surface is preferably a section of a cylinder or cone, but may exhibit irregularities or discontinuities for special applications.

2 Claims, 13 Drawing Figures

METHOD FOR GRINDING CIRCULAR SAW TEETH TO AN IMPROVED METAL BREAKING GEOMETRY

This is a division of application Ser. No. 587,504, filed June 16, 1975.

CROSS REFERENCE TO RELATED APPLICATIONS

A method and apparatus for automatically grinding saw teeth to the improved geometry is disclosed in copending application Ser. No. 540,449 filed Jan. 13, 1975.

BACKGROUND OF THE INVENTION

1. Field of the Invention

The invention concerns a circular saw having an improved tooth geometry which is especially adapted for cutting hard, brittle metals.

2. Description of the Prior Art

Circular saw teeth with carbide inserts, initially having a cylindrical or spherical shape are known to those of ordinary skill in the art. For example, Goehle U.S. Pat. No. 2,675,603 discloses the use of a cylindrical carbide element as a tooth in the context of a composite circular saw. While the insert is cylindrical in shape, it is eventually ground and faced so as to have a conventional working surface. Kolesch U.S. Pat. No. 3,537,491 and Tyler U.S. Pat. No. 3,788,182 both disclose the use of spherical carbide ball inserts adapted for use in other circular saws. However, as in the case of Goehle, the spheres are subsequently faced and the remaining rounded section of the sphere is not in actuality the working surface. Lewis U.S. Pat. No. 485,503, Bruestle et al., U.S. Pat. No. 2,860,863 and LaVelle, U.S. Pat. No. 3,380,497 all disclose prior art circular saws having a rounded profile when seen from either the front or back of the tooth. Again, the working surface is neither cylindrical, conical or spherical. Osgood, U.S. Pat. No. 238,521 and Pioche, U.S. Pat. No. 1,334,633 likewise disclose saws in which the side view profile of the tooth is rounded or cylindrical in some aspects but wherein the working surface is neither spherical, conical or cylindrical.

The problem encountered with old-fashioned carbide tooth saws is two-fold. One of the problems associated with carbide tips is that the carbide insert is hard and brittle and cannot take interrupted cutting. During interrupted cutting the sock loading on the teeth is so great that the teeth will frequently break. The second problem associated with conventional carbide insert saws is that carbide has an affinity for many metals that it cuts. Frequently, a metal chip will get stuck on the face of the carbide insert or in the gullet thereunder. According to prior art methods of cutting, it was often necessary to get rid of this excess metal by means of an air blast or brushes. Unfortunately, these techniques were not always satisfactory and resulted in great blade deterioration.

Recently, a saw blade having an improved metal cutting geometry was disclosed in U.S. Pat. Nos. 3,576,061 and 3,619,880. This is often referred to as the "German" geometry. According to those inventions, an improved cutting characteristic could be achieved by slightly beveling the top face of the tooth down towards the side of the tooth. This technique is similar to the technique of "breaking the corners" in order to prolong saw blade life. While the saws disclosed in U.S. Pat. Nos. 3,576,061 and 3,619,880 do display some improved cutting characteristics, they are nevertheless difficult to manufacture because they require several different grinding steps in order to achieve a satisfactory geometry. What was desired in this context was a saw blade that exhibited cutting characteristics better than those disclosed in U.S. Pat. Nos. 3,576,061 and 3,619,880 and which were easier to grind and regrind. It was in the context of the foregoing prior art and prior art problems that the following invention arose.

SUMMARY OF THE INVENTION

Briefly described, the invention according to its preferred embodiment comprises a circular saw having teeth with an improved metal cutting geometry. The improved circular saw is formed in the well known triple-chip manner wherein high center cutting teeth are disposed alternatively between lower wider teeth. The teeth preferably have a negative rake angle in the range of $-5°$ to $-10°$ but could be within the range of $-20°$ to $+25°$.

The aforedescribed circular saw differs from prior art saws in that each leading face of the saw teeth has a uniquely curved working surface. The working surface is generated by bringing each tooth successively into contact with a rotating grinding wheel having a grinding surface on its inner rim. The working surface thus generated by this method typically comprises a section of a cone or cyliner but may conceivably take other irregular rounded shapes. The novel working surface may be characterized by the fact that all points on the working surface of the tooth which lie in the same given plane perpendicular to the axis of rotation of the grinding wheel are equally distant from any given point on that axis of rotation. Alternatively, the working surface can be thought of as a surface such that a cross section in a given direction will produce a sector of a circle of rotation. It has been discovered that teeth generated in this fashion exhibit metal cutting characteristics superior to those of the teeth of conventional and previously known saw blades. This improved metal cutting characteristic is due, in large part, to the fact that the continuously curved profile of the working surface allows the metal chips to effectively roll off the working surface more easily than with many prior art saw blades. Additionally, this contour is much easier to manufacture since only one grinding operation per tooth is necessary to form the working surface. This constrasts to many prior art saw blade teeth wherein several passes with a grinding wheel were necessary to perfect the tooth geometry. These and other advantages of the invention will be more fully understood with reference to the following drawings.

BRIEF DESCRIPTION OF THE DRAWINGS

FIG. 1b is a superimposed front elevation of a high and a low circular saw tooth which were fabricated in the triple-chip manner illustrated in FIG. 1a.

FIG. 2b is a front elevation of the tooth identified as element A in FIG. 2a.

FIG. 2c is a front elevation of the tooth identified as element B in FIG. 2a.

FIG. 3b is a top plan view of the improved saw tooth of FIG. 3a.

FIG. 3d is a detailed view of tooth B of FIG. 3a.

DETAILED DESCRIPTION OF THE INVENTION

During the course of the detailed description, like numbers will be used to identify like elements according to the different figures which illustrate the invention.

Figure 1A:
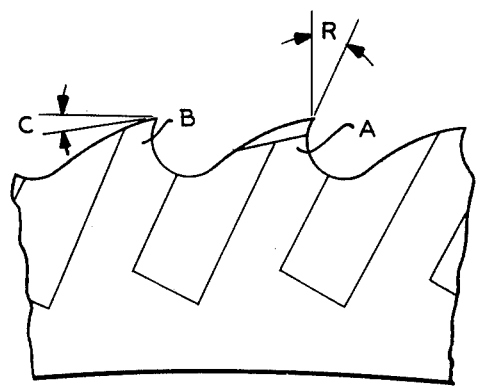
FIG. 1a is a side elevation of a conventional circular saw manufactured according to the well known triple-chip form.
Figure 1B:
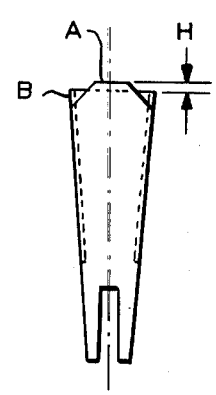

A prior art circular saw ground according to the well known triple-chip form is illustrated in close up detail in FIG. 1a. According to the triple-chip technique, a leading tooth A removes a center chip and a trailing tooth B removes two chips flanking the center chip removed by tooth A. Leading tooth A is typically taller than trailing tooth B. This relationship is illustrated in superimposed fashion in FIG. 1b. The shape of the saw teeth can further be described in terms of a rake angle R and a clearance angle C. The rake angle R may be defined as the angle subtended by the face of each tooth with respect to a line drawn between the top of the tooth and passing through the geometrical center of the circular saw. The clearance angle C may be defined as the angle subtended by a line parallel to the surface of the top of a tooth with respect a line tangent to the top of a tooth. The term rake angle and clearance as they are used in this context carry with them the conventional connotations typically ascribed to them in the saw tooth art.

Figure 2A:
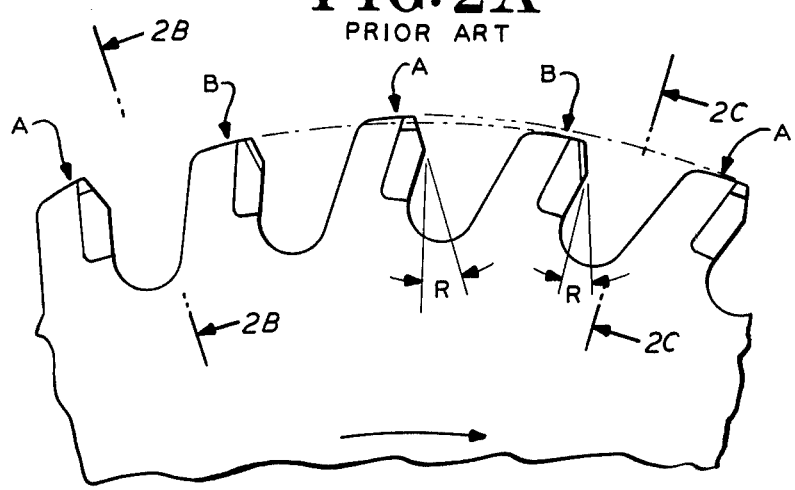
FIG. 2a is a side elevation of the circular saw teeth disclosed in U.S. Pat. No. 3,576,061.
Figure 2B:
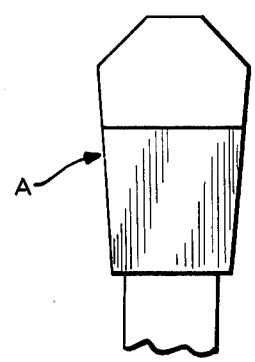
Figure 2C:
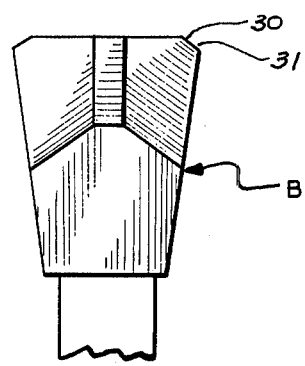

FIGS. 2a – c illustrate another prior art triple-chip circular saw blade. The teeth disclosed in FIGS. 2a –c are described in further detail in U.S. Pat. Nos. 3,576,061 and 3,619,880. Among other features, the "low" teeth of this improved design include laterally opposed cutting corners 30 and cutting edges 31 which add to its improved performance. The teeth described in FIGS. 2a–c are frequently referred to in the saw tooth art as being teeth manufactured according to the new German geometry. Saw blades manufactured according to the German geometry tend to exhibit better metal cutting characteristics and longer life. However, they are uniformly difficult to grind since each saw tooth requires at least two and sometimes more individual grinding operations in order to produce the facets necessary to create the desired geometry. It is a major purpose of the present invention to provide circular saws having metal cutting characteristics superior to the characteristics associated with the new German geometry and, further, it was the purpose of the present invention to provide a geometry which could be formed with only one grinding operation. The decrease in the number of grinding operations achieved by the present invention directly increases the profitability per grinding machine. For example, if a grinding machine in a saw grinding plant is being used full time, and if the grinding steps per tooth can be reduced to one grinding operation, than that particular machine may be able to grind more saws per any given time period.

Figure 3A:
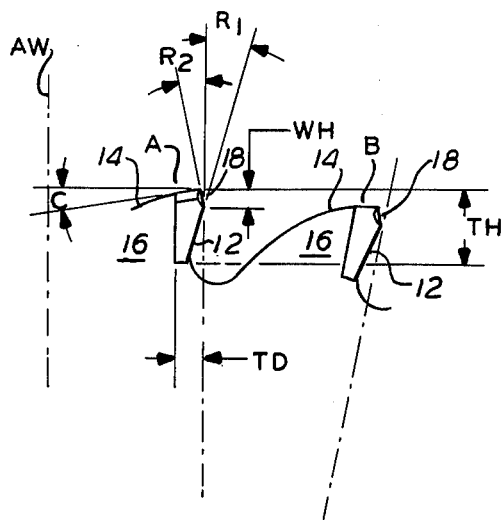
FIG. 3a is a side elevation of a section of a circular saw according to the preferred embodiment of this present invention.
Figure 3B:
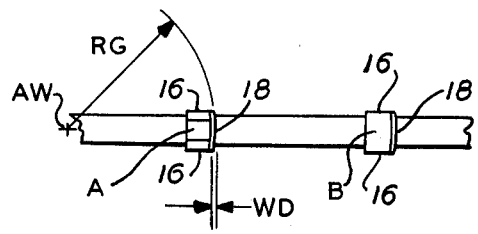
Figure 3C:
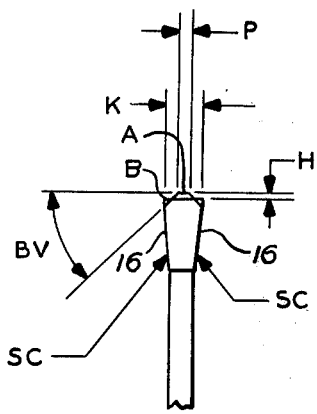
FIG. 3c is a front superimposed view of the saw tooth of FIG. 3a illustrating the triple-chip design.

Circular saw teeth generated according to the teaching of the present invention are illustrated in detail in FIGS. 3a–e. In FIG. 3a the saw teeth ground according to the present invention are illustrated in the context of a triple-chip ground saw blade. According to the triple-chip principal, a plurality of high leading teeth A are interspersed alternatively with the plurality of low trailing teeth B. A circular saw ground according to this teaching therefore includes a plurality of teeth A and B arranged in the following sequence A,B,A,B,A,B, etc. Each tooth A and B includes a front leading surface 12 and a back trailing surface 14. Each tooth further includes a pair of substantially similar side surfaces 16 and a front working surface 18. It will be noted in FIGS. 3a and 3b that the working surface 18 appears on both the higher leading tooth A and the lower trailing tooth B. In FIG. 3c the front profile of the leading tooth A is superimposed over the front profile of trailing tooth B. Since the circular saw, according to the preferred embodiment, is manufactured using the triple-chip technique, the leading tooth A is higher than the trailing tooth B by an amount H. In the preferred embodiment, H may range from 0.010 to 0.012 inches. Also, according to the preferred embodiment, the leading tooth A has a central top plateau surface P with dimensions of approximately 0.12 inches. The top sides of tooth A are tapered with a bevel BV of approximately 45°. Both teeth have a side clearance SC of approximately 2° and tooth B exhibits a kerf K of 0.247 inches approximately.

Referring back to FIGS. 3a and 3b, both teeth A and B exhibit a tooth depth TD of approximately 0.18 inches and a tooth height TH of approximately 0.50 inches. The tooth clearance angle C lies in the range of 9° – 11°. The working surface 18 of teeth A and B has a height WH of approximately 0.12 inches and a width WD or crown of approximately 0.007 inches when viewed from above as in FIG. 3b. According to FIG. 3a the unground leading surface 12 exhibits a forward rake angle $R_1$ of approximately 15°. The working surface 18, however, exhibits a minus rake angle $R_2$ of approximatly −10°. In practice, the rake angle $R_2$ of the working surface 18 can be anywhere within the range of −20° to +25°. It has been found though that for the majority of all operations, a negative rake angle $R_2$ in the range of −5 to −10° is preferable.

Figure 3D:
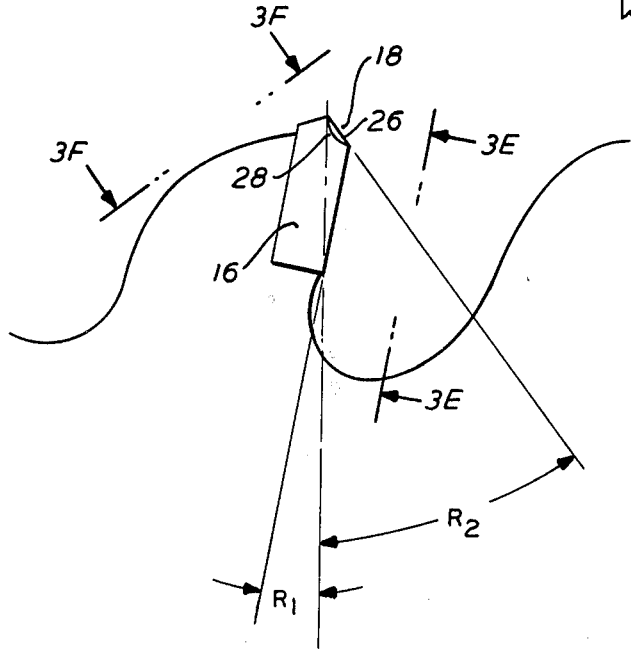
Figure 4A:
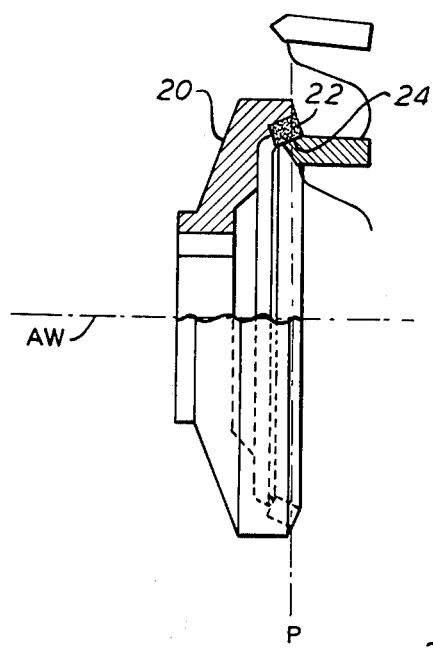
FIG. 4a discloses a method of grinding circular saw teeth to the improved geometry of the present invention.
Figure 4B:
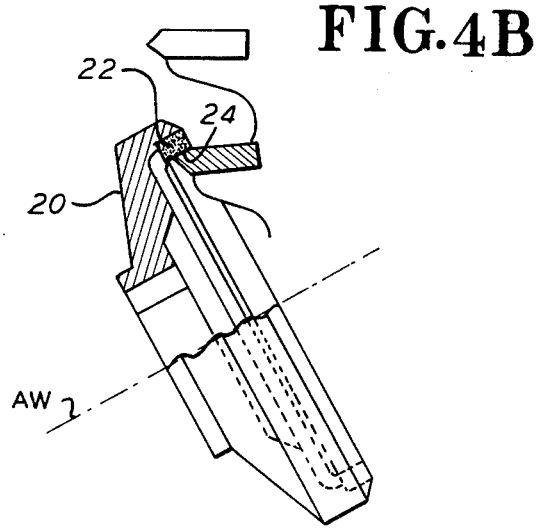
FIG. 4b discloses an alternative method of grinding the saw teeth of a circular saw to the improved geometry.

The working surface 18 is generated by a grinding wheel 20 having an abrasive inner grinding surface or rim 22. The grinding method is illustrated in FIGS. 4a and 4b and will be discussed in more detail infra. According to the technique illustrated in FIGS. 4a and 4b, the grinding wheel 20 is caused to revolve about a central axis AW. The distance from the grinding wheel axis AW to the surface of the tooth and therefore to the inner surface 24 of the abrasive rim 22 is designated as RG. In practice, the grinding radius of the wheel RG may be in the range of 1 – 4 inches. According to the preferred embodiment, the radius RG as illustrated in FIGS. 3a and 3d is approximately 1 inch. The working surface 18 imparted by the grinding wheel 20 to tooth A or B has a shape that is dictated largely by the contour of the surface 24 of the tooth 22. For example, if the surface 24 has a straight profile as shown in FIG. 4a but is tapered inward towards the axis AW, then the working surface of the tooth 18 may be slightly conical in shape. In other words, the working surface 18 will describe a section of a cone. Alternatively, the grinding surface 24 could be straight and parallel to the axis AW as in FIG. 4b in which case the ground surface would be a sector of a cylinder. Obviously, if grinding surface 24 were irregular or curved, then the surface 18 generated by such a grinding surface 24 would be a sector of an irregular surface of rotation. The characteristic that all working surfaces 18 have in common is that they are all generated by a circular grinding wheel of the sort illustrated in FIGS. 4a and 4b. Therefore, the working surface 18 must be such that the center of the working surface 26 is slightly more forward than the sides of the working surface 28 where they come into contact with the sides 16 of the teeth A or B. The working surface 18 generated according to the method of FIGS. 4a and 4b can also be described in terms of a plane P which is perpendicular to the reference axis AW and passes through the working surface 18. Since the working surface 18 is generated by the revolution of the wheel 20, the points on its surface can be characterized by the fact that all points on the working surface 18 which lie in the same given plane P perpendicular to the axis of rotation of the grinding wheel AW are equally distant from any given point on that axis AW. This is self-evident since any given point X on the face of the grinding surface 24 will revolve in a circle about the reference axis AW. Since the working surface 18 is only a section of a surface of rotation, that section of the working surface 18 cut by the plane P will be equi-distant from any given point on reference axis AW.

Figure 3E:
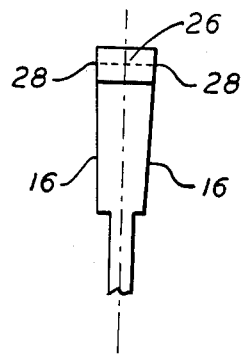
FIG. 3e is a view of the improved saw tooth of FIG. 3d as seen from perspective 3e—3e.
Figure 3F:
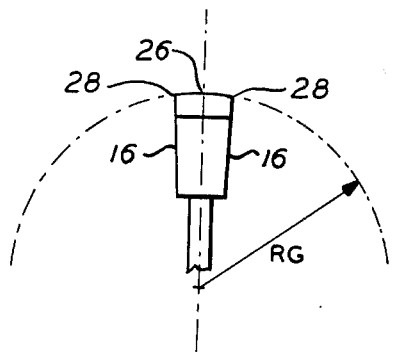
FIG. 3f is a view of the improved saw tooth of FIG. 3d as seen from perspective 3f—3f.

Details of a typical tooth are shown in FIGS. 3d, 3e and 3f. FIGS. 3d–f illustrate, in particular, the curved nature of the working surface 18. As discussed previously, the center 26 of the working surface 18 is further advanced than the edges of the working surface 28. This feature is especially prominent in FIG. 3f. FIG. 3f corresponds to a view of the working surface 18 wherein the plane of 3f is parallel to plane P as illustrated in FIG. 4a. Note that the working surface 18 as seen from view 3f forms a sector of a circle having a radius corresponding to the grinding radius RG of the grinding wheel 20. According to the preferred embodiment of the invention, the working surface 18 may actually form a section of the area of a cone. However, since the working surface 18 is produced by rotary action, any plane perpendicular to the axis of rotation AW of the grinding wheel 20 and passing through the working surface 18 will bisect a section of a circle. Therefore, any point on that bisected portion of the working section 18 will be equi-distant from any given point on the grinding axis AW. This relationship will be so regardless of whether the working surface 81 is a portion of a cone, a cylinder or some surface exhibiting irregularities in the direction of the reference axis AW.

A method of producing saw teeth having the new geometry was discussed with reference to FIG. 4a. In FIG. 4a, the grinding wheel 20 includes an abrasive rim 22 having a grinding surface 24 which is canted at an angle with respect to reference axis AW. According to this technique, the grinding wheel 20 is brought into grinding contact with the blade 10 in such a manner that the axis AW almost passes through the center of the circular saw 10. Unfortunately, this technique, which is described in greater detail in co-pending application Ser. No. 540,449 filed Jan. 13, 1975, is rather limited since it only produces a saw tooth having a fixed rake corresponding to the angle between the grinding surface 24 and the axis AW. Since the axis AW is unchangeable relative to the rest of the machinery, a new grinding wheel 20 must be employed each time a saw is to be ground to a different rake angle.

In order to overcome the necessity of having multiple grinding wheels for different rake angle requirements, the apparatus illustrated in FIG. 4b was perfected. According to the apparatus of FIG. 4b, the grinding surface 24 of the abrasive grinding rim 22 is approximately parallel to the reference axis AW of the grinding wheel 20. In order to achieve different rake angles, the grinding wheel 20 is set on a spindle (not illustrated) which may be selectively positioned at a variety of different angles relative to the circular saw blade 10. A technique for positioning spindles is known. By adjusting the reference axis AW relative to the saw blade 10 it is possible to generate a variety of working surfaces 18 having different rake angles. Of course, if a different degree of curvature is desired to be put upon the working surface 18, it is necessary to use a variety of grinding wheels. As previously discussed, grinding wheels with a radius in the range of 1–4 inches are preferred.

The saw blade manufactured according to the teachings of the present invention exhibits several characteristics superior to those of prior art saw blades including those manufactured according to the German geometry. In particular, a saw blade manufactured according to the present invention tends to break up and displace the metal in a much more efficient manner than was heretobefore known. Since the working surface 18 is continuously curved in a circular fashion, the metal chips tend to be directed away from the working surface 18. This helps minimmize the problem associated with prior art carbide tips in that the carbide in the prior art saw tips has an affinity for the metals they cut. This affinity caused the steel chip to adhere to the surface of the prior art carbide tip saws thereby lowering the cutting effectiveness of the saw and occasionally causing high speed saw breakage due to chip clogging. The improved working surface geometry of the present invention tends to break up metal more efficiently, makes it freer cutting and reduces the problem of getting the metal chip off the face of the tooth and out of the gullet. According to the prior art, it was often ncessary to use brushes and air blasts to get the metal chips off the carbide saw tooth tips. The problem of metal affinity for carbide was especially acute when saws having a negative rake angle were employed to cut the metal. This is due to the fact that a saw having a negative rake angle tends to shear or displace its way through the metal whereas saws having a positive rake angle tend to cut. As was previously discussed, this particular invention is especially adaptable for saws having a negative rake angle in the range of −10 to −50°.

Another improved characteristic of the present invention is that saws incorporating the new geometry can be ground or reground using only one grinding operation per saw tooth. This greatly improves saw grinding efficiencies and economies due to the fact that many prior art geometries including the German geometry often require two or more discreet grinding steps per individual saw tooth. Obviously, the more grinding steps necessary per tooth, the greater the time required to grind each individual saw.

While the invention has been described in terms of preferred embodiment, it will be appreciated by those of ordinary skill in the art that the invention may be practiced on a variety of blades having various different characteristics. For example, while the typical saw blade upon which the invention may be practiced is about 26 inches in diameter, the diameter could range anywhere from 4 inches to approximately 84 inches in diameter. Also, tooth thickness can range from between ⅛ inch to 1 inch and the plate thickness may be as much as ¾ inch for an 84 inch circular blade. Gullet depth, of course, varies with the diameter of the saw and may range from 0.047 inches to as much as 4 inches.

The numer of teeth per circular saw blade varies according to the requirements of the material to be cut. The number of teeth for a blade with a diameter of 40–60 inches may vary from 20–60 teeth. On the other hand, a 4 inch diameter blade may have as many as 80 teeth.

As discussed infra the circular saw of the preferred embodiment comprises a carbide tipped triple-chip saw having a negative rake angle in the range of −5 to −10°. Such saws are especially adapted for cutting metals of all types. However, it is anticipated that a saw according to the present invention may be used for non-metal applications, but this is anticipated to comprise no more than 20% of its expected usage.

While the invention has been particularly shown and described with reference to the preferred embodiment thereof, it will be understood by those skilled in the art that various changes in form and detail may be made therein without departing from the spirit and scope of the invention.

I claim:

1. A method for grinding a tooth of a triple-chip type saw blade to an improved contour by means of a rotatable cup-shaped grinding wheel having an abrasive rim, the method comprising the steps of:
    bringing the top portion of the front face of said tooth into contact with the abrasive rim of said rotatable grinding wheel; and,
    grinding said top portion of the face of said tooth to a continuous curved contour having a more negative average rake angle than the remaining lower portion of the face of said tooth.

2. A method for grinding a tooth of a triple-chip type circular saw blade to an improved contour by means of a rotatable cup-shaped grinding wheel having an abrasive rim, the method comprising the steps of:
    bringing the top portion of the front face of said tooth into contact with said abrasive rim of said rotatable grinding wheel; and,
    grinding said top portion of said tooth to a continuous curved contour having a negative rake angle.

* * * * *